March 13, 1928.
K. E. PEILER
1,662,436
APPARATUS FOR AND METHOD OF FEEDING MOLTEN GLASS
Filed July 17, 1920   3 Sheets-Sheet 3
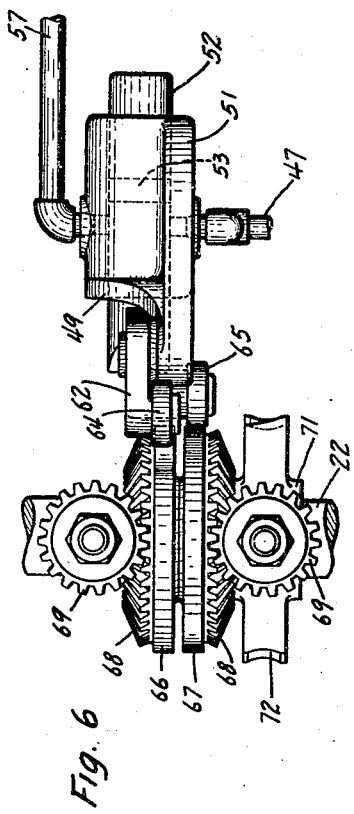
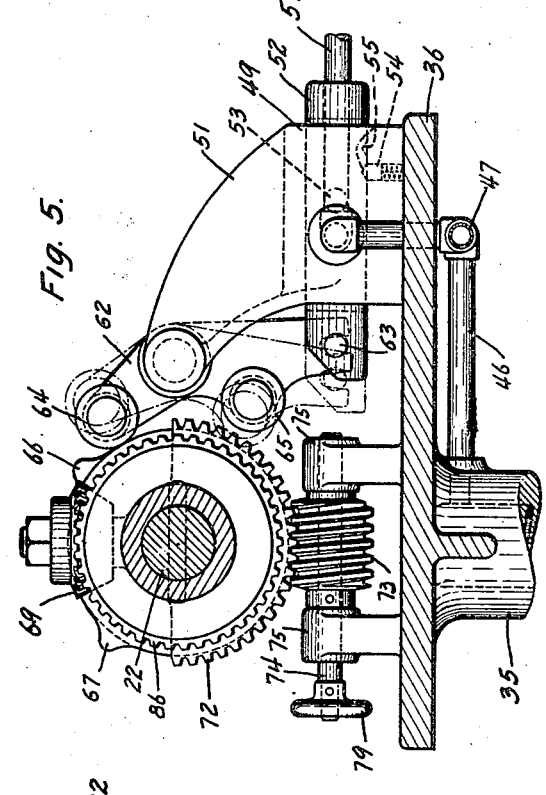
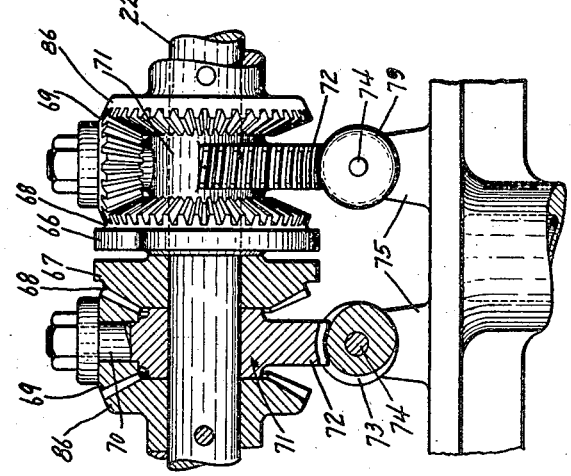
INVENTOR
KARL E. PEILER
BY
ATTORNEY Patented Mar. 13, 1928.

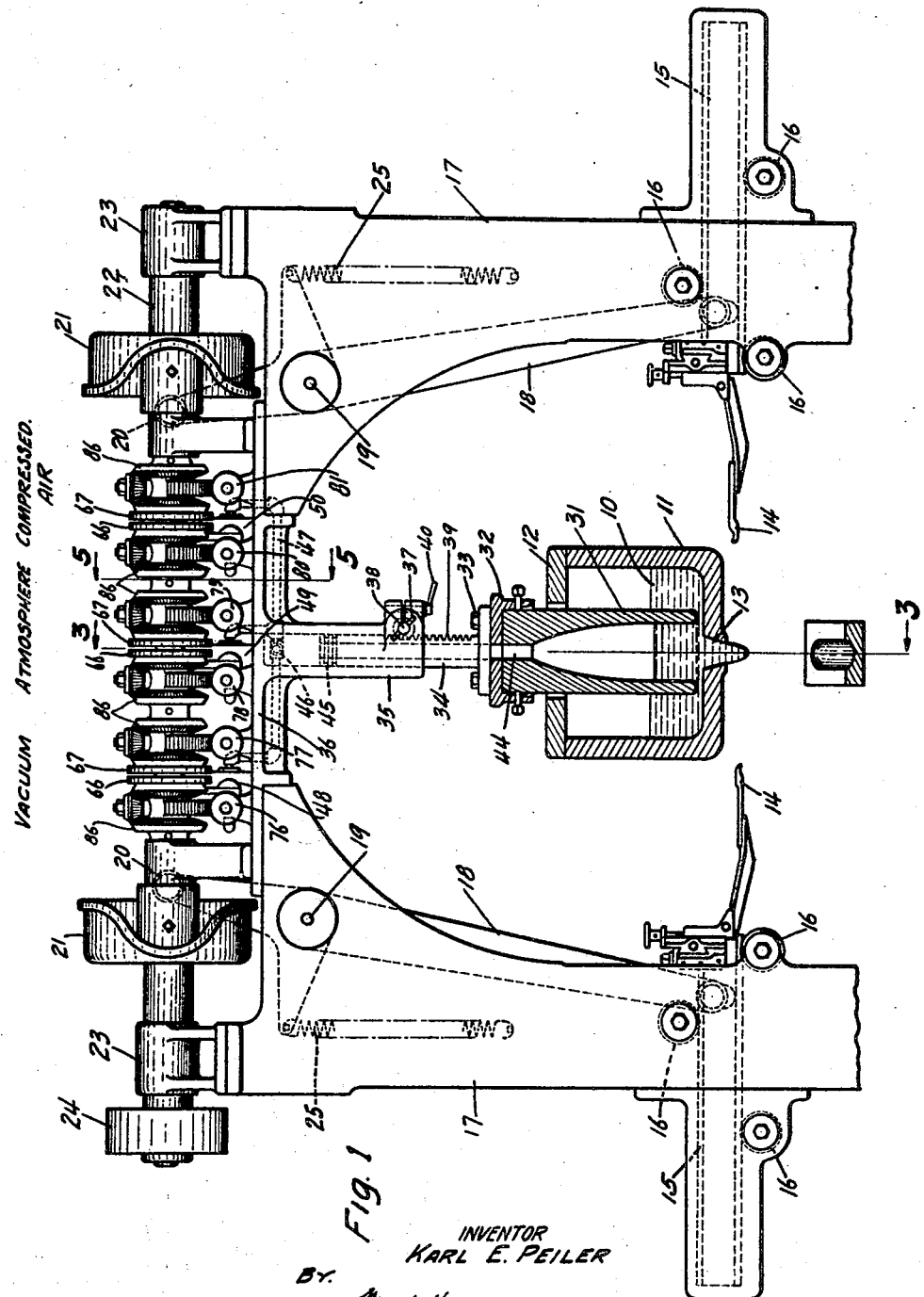

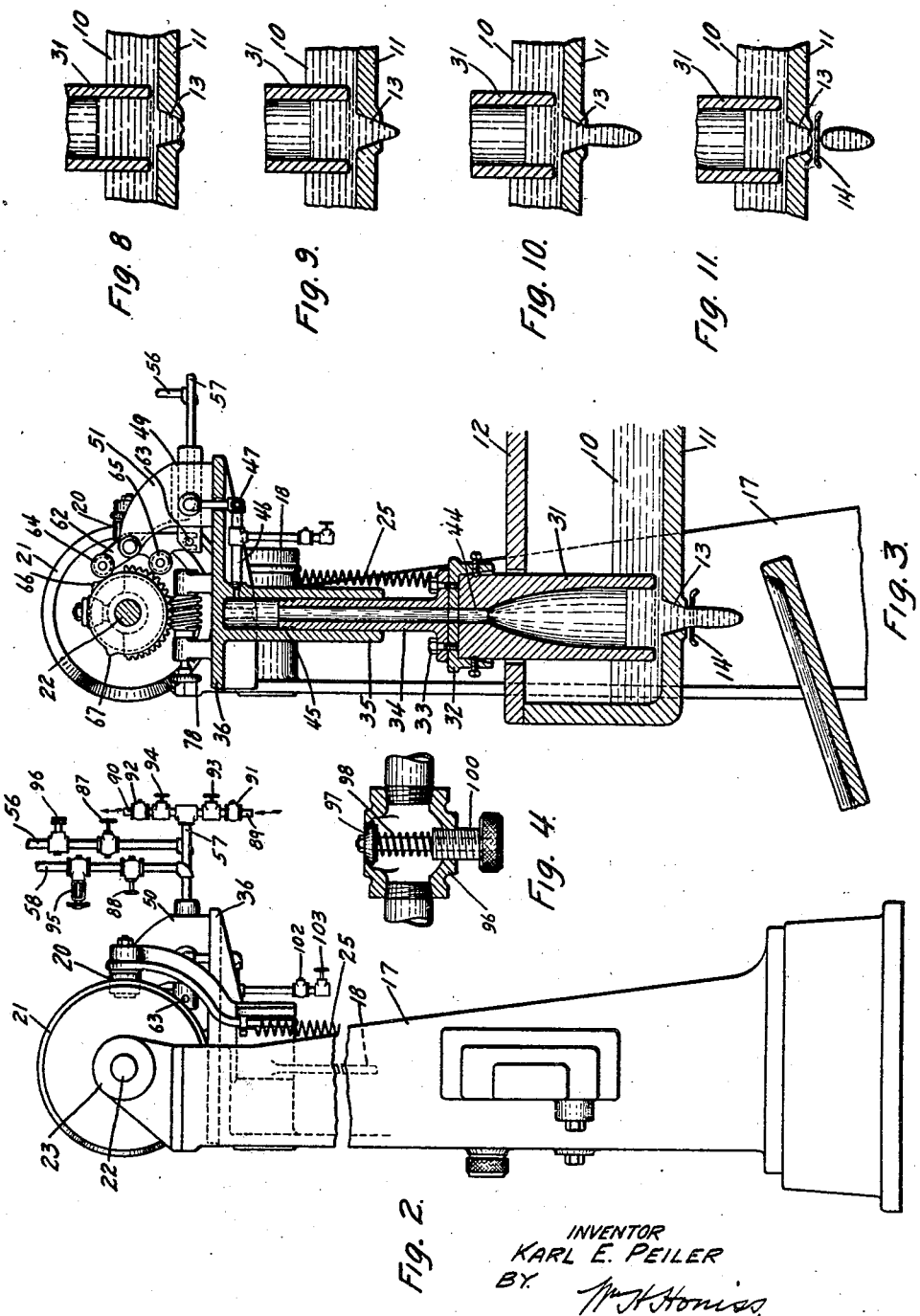

1,662,436

UNITED STATES PATENT OFFICE.

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE.

APPARATUS FOR AND METHOD OF FEEDING MOLTEN GLASS.

Application filed July 17, 1920. Serial No. 396,934.

This invention relates to apparatus for feeding molten glass to the devices by which it is to be formed into glassware, as by molding or blowing. More specifically, the invention comprises apparatus constructed and arranged to separate and deliver a series of masses of glass of suitable size and shape to serve as mold charges for the subsequent forming operation.

Various machines have been provided for this purpose in which the container for the molten glass is provided with a submerged outlet and the flow and cessation of flow is caused by extruding and intruding impulses imparted to the glass in the vicinity of the outlet. In some of these machines the impulses are produced by changes in the air pressure on the surface of the glass near the outlet, that is, the air is compressed above atmospheric pressure to cause extrusion of the glass and reduced to a partial vacuum to cause a cessation or in some cases, an intrusion of the extruded mass, or of the stub left after severance. Shears are usually provided to cut off a mold charge from the gather thus formed. In this way a series of charges is formed, of a size dependent in part on the pressure and duration of the application of the abnormal air pressures, and these charges are of uniform size and shape so long as all conditions remain constant.

It has been found to be highly desirable that the shape of the extruded gather and of the mold charge severed therefrom, should be capable of variation in order that it may be better adapted for use with molds of different shapes. Furthermore, in order to maintain any particular size or shape of gather, it is necessary that the machine shall be capable of delicate relative adjustment between the several parts and forces acting to form the gather.

The object of the present invention is to provide a machine of the general character described which will deliver a series of uniform mold charges of a size and shape best adapted to use in the ware being manufactured. To the accomplishment of this object the features of the invention reside in such a machine having provision for relative adjustment of the several forces acting to form the gather. The several impulses acting to form the gather are preferably produced by variation in the air pressure on the surface of the glass, and means are provided for changing the air pressure from a condition approaching a vacuum to normal atmospheric pressure and to a condition of compression higher than normal. Means are also provided to permit relative adjustment of the time of occurrence and duration of the various air pressures acting to form the gather. By a proper adjustment of these pressures, mold charges of any desired shape and size may be produced and adjustments may be made to counteract changes in working conditions, such for example, as variation in the viscosity of the glass, whereby uniformity in shape and size of the charges may be maintained.

These features of the invention and such others as may hereinafter appear will best be understood from the following description taken in connection with the accompanying drawings of one embodiment of the invention in which:—

Fig. 1 is a front elevation of a feeding machine, a portion of the cooperating glass container or furnace being shown in section;

Fig. 2 is a side elevation looking from the right in Fig. 1;

Fig. 3 is a central vertical section on the line 3—3 of Fig. 1;

Fig. 4 is a detail on an enlarged scale showing one of the pressure controlling valves in section;

Fig. 5 is a detail view of one of the adjusting devices by which the application of pressure is controlled, the section being taken on the line 5—5 of Fig. 1;

Fig. 6 is a plan view of certain parts shown in Fig. 5;

Fig. 7 is a front elevation of the parts shown in Fig. 6, partly in section, and Figs. 8, 9, 10 and 11 are a series of diagrammatic views showing certain steps in the formation of a gather and mold charge.

The molten glass 10 (Figs. 1 and 3) which is to be divided into mold charges is confined in a container 11 of suitable refractory material, which may be a part or extension of the furnace in which the glass is originally melted, or a separate receptacle to which the molten glass is delivered. The container 11 would ordinarily be provided with heat retaining devices such as a cover 12 and insulating packing which is not illustrated. The container is provided with an outlet 13 so positioned as to be below the normal level of the glass and submerged therein.

It is usual to provide severing means beneath the discharge outlet to sever mold charges from the gathers discharged and suspended from the outlet. In the severing means selected for the purpose of illustration, two cooperating shear blades 14 are mounted on the inner ends of slides 15 guided by anti-friction rolls 16 carried by the columns of a bridge member 17. The slides are actuated to sever the mold charge by a pair of levers 18 pivoted on the bridge member at 19 and having their upper ends provided with rolls 20 held in engagement by springs 25, with a pair of cams 21, fixed on a shaft 22 mounted in bearings 23 attached to the top of the bridge member 17. The shaft is provided with a pulley 24 by which it may be driven through a belt connected with a source of power.

The air pressure for controlling the formation of the gather may be applied to the whole of the surface of the glass in the container, in which case it would be necessary to make the container substantially air tight, but it is preferred to apply the controlling pressure to a limited surface only. In order to limit the surface exposed to the variable pressure as well as to provide additional means for regulating the flow of glass, the space above the outlet 13 is enclosed within the walls of a chamber formed by a hollow cylinder 31 of refractory material, hereinafter referred to as the bell. The glass extruding from the outlet 13 first passes between the bottom of the bell and the bottom of the receptacle 11, therefore, by varying the vertical position of the bell 31 the volume of glass entering the bell and discharged at the outlet 13 may be varied. In order to provide for this vertical adjustment of the bell, it is provided with a cap 32 which is attached by screws 33 to a flange formed on the lower end of a tube 34. The tube is slidably mounted in a sleeve 35 depending from a table 36 forming the top of the bridge member 17. The tube 34 and the attached bell may be adjusted vertically by the manipulation of a handle 37 on the end of a shaft 38 formed integral with a pinion mounted in the lower end of the sleeve 35 and in mesh with rack teeth 39 cut in the side of the tube 34. The parts are locked in adjustable position by a hand screw 40 which clamps the split bearing on the shaft 38 of the adjusting pinion.

The shape of the gather formed below the outlet 13 may be controlled within certain limits, by variation in the impulse imparted to the glass in the outlet, that is, an increase in the pressure on the glass from within will cause a more rapid extrusion, and thus increase the diameter of the gather and conversely, a decreased impulse will reduce the extrusion and therefore decrease the diameter of a corresponding portion of the gather. The various impulses imparted to the glass in or near the outlet may be produced by mechanical means; but the present invention contemplates the practice of this method by pneumatic means. To this end means are provided for varying the air pressure in the chamber of the bell 31, by which corresponding impulses are imparted to the glass in or near the outlet. It is to be understood that the term "air pressure" as used in this description and in the appended claims, comprehends within its meaning any pressure, whether above or below normal atmospheric, unless otherwise limited by the context. It will be apparent, therefore, that increased pressure in the chamber will cause a more rapid extrusion through the outlet 13, thus increasing the diameter of that portion of the gather then being extruded. If the air pressure is then reduced to normal atmospheric pressure, the action of gravity will produce a thinner or neck portion. As the air pressure is reduced below atmospheric, the extrusion will decrease and finally stop, and may become an intrusion. The configuration of the gather may be still further varied by the rapidity with which the air pressure is changed, and an important factor in determining the shape of the gather is the relative time of application and duration of the various pressures applied to the glass.

In the illustrated embodiment of the invention provision is made for applying to the air containing chamber three different pressures, which are; a pressure below atmospheric, i. e., a partial vacuum; normal atmospheric; and a pressure above normal, i. e., compressed air. It will be obvious that the pressure applying devices may be increased in number, so as to apply a greater variety of pressures if so desired. These various pressures are automatically controlled so as to be applied and released in any desired sequence by independently adjustable controlling devices which act to open and close valves located in the respective air conduits. The cycle of the machine is further adjustable to vary the duration of any of these pressures by the provision of means for relatively adjusting the opening and closing time of each valve so that the valves may not only be actuated in any desired sequence, but the time of the opening and closing movement of each valve also may be adjusted as may be necessary to produce a gather of any desired form. On account of the well-known characteristic of glass feeding machines, by which any interruption in operation causes a change in working conditions, all these adjustments may be made during the continuous operation of the machine. This is also of advantage as it enables the operator to observe instantly the effect of such adjustment, so that the adjusting movement may be continued progressively until the desired result has been obtained.

The various pressures are transmitted to the chamber of the bell 31 through a hole 44 in the upper part of the bell which is in alignment with the hole in the tube 34, which, in turn, communicates with the interior of the sleeve 35. In order to prevent leakage, the joints between the bell 31, its cap 32 and the flange on the tube 34 may be packed with suitable material. The sliding connection between the tube 34 and the sleeve 35 is made practically air tight by the provision of packing rings indicated at 45 (Fig. 1). The interior of the sleeve 35 is connected by a pipe 46 (Figs. 1, 3 and 5) with a horizontal pipe 47 having three branches leading respectively to three valves, a vacuum controlling valve 48, a relief valve 49 communicating with the atmosphere, and a pressure valve 50 connected with a supply of compressed air.

The three valves and their actuating means are identical in construction so that but one need be described. The relief valve 49 is shown particularly in Figs. 3, 5 and 6. A bracket 51 is attached to the table 36 and provided with a bore having a sliding plunger 52 which may be provided with the usual stuffing boxes if desired. The plunger has a transverse opening 53 arranged to be brought into line with two holes in the bracket when the plunger is properly positioned. One of these holes communicates with the interior of the bell through connections to the pipes 47 and the other is connected by a pipe with the source of compressed air or vacuum or the atmosphere, the application of which is to be controlled by the particular valve. The valve is yieldingly held in open or closed position by a spring pressed detent 54 (Fig. 5) which engages one or the other of two notches 55. In this manner the vacuum valve 48 connects with a pipe 56, leading to a suitable exhaust system, the relief valve 49 connects with a pipe 57 which is preferably open to the atmosphere, but which may lead to a source of pressure slightly above or below atmospheric if desired, and the pressure valve 50 connects with a pipe 58 leading to a compressed air supply.

In order that the time of occurrence and duration of any pressure may be freely adjustable, each valve is actuated by two separate and relatively adjustable cams, one to open the valve and the other to close it. These cams are all adjustably mounted on the shaft 22, which actuates the severing mechanism, so that a variable timed relation is always maintained with relation to the severing operation, and the times of opening or of closing any valve may be freely adjusted, independently of each other and of the other valves. As shown in Figs. 5, 6 and 7, each plunger 52 is arranged to be moved by a lever 62 mounted on the bracket 51 and having a slotted lower end which engages a pin 63 on the plunger. Each lever carries on opposite sides of its fulcrum two offset rolls 64 and 65 which are in operative relation, respectively, with cams 66 and 67. It will be evident from an inspection of Figs. 5 and 6 that the cam 66 acts to move the parts into the dotted line position to open the valve in which position the parts are held by the detent 54 until the cam 67 acts to close the valve.

The cams 66 and 67 are loosely mounted on and indirectly driven by the shaft 22, but in order that the time of operation of each cam may be independently advanced or retarded there is a geared driving connection between the shaft and each cam which is capable of adjustment to vary the timing of the cams. Each cam is provided with an integral bevel gear 68 in mesh with a bevel pinion 69 freely rotatable on a stud 70 formed on a collar 71 also loosely mounted on the shaft 22. The collar 71 is held in adjusted position by a segmental gear 72 formed integral therewith, which engages a worm 73 fixed on a shaft 74 mounted in bearings 75 projecting from the table 36. In the illustrated embodiment of the invention, there are six of these cams to be adjusted, therefore, the six shafts 74 are provided with hand wheels 76, 77, 78, 79, 80 and 81, respectively (Fig. 1) by which the angular position of the several pinions 69 may be independently adjusted. Each pinion 69 is driven by a bevel gear 86, fixed on the shaft 22. As a matter of convenience, two of bevel gears 86, when adjacent, are made in a single casting as shown in Fig. 1, so as to drive adjacent cams. By this construction each cam gear 68 will be driven by a gear 86, but in the opposite direction therefrom, and the timing of each cam may be varied by turning its hand wheel. In this way, the opening and closing time of any valve may be independently adjusted and this may also vary the duration of the open period of the valve.

One of the features of the present invention relates to the mechanism by which the speed at which the air pressure is changed may be adjusted. This is preferably accomplished by providing a valve or throttle in each pipe through which pressure is controlled. For example, a pressure may be slowly or more quickly built up from normal pressure or a vacuum, the time depending upon the size of the orifice in the valve through which the air must pass. Similarly pressure may be slowly or quickly reduced from normal or from above normal to a partial vacuum.

This controlling mechanism is shown particularly in Fig. 2 in which the pipe 56, communicating with a source of vacuum, is provided with a throttle valve 87 which may be of the usual needle type. The pipe 58 for the compressed air is provided with a similar valve 88. In order that the return to atmospheric pressure from a higher or lower pressure (that is, after the application of compressed air or vacuum) may be independently controlled, the relief pipe 57 is provided with two branches, one branch 89 through which the air passes into the chamber after a vacuum has been formed and a branch 90 through which compressed air may escape. The direction in which the air can pass through the branches 89 and 90 is determined by check valves 91 and 92 of the usual construction which permit the passage of air in the direction of the arrows only. Each branch is provided with a throttle valve 93 and 94 respectively, by which the rate of flow of the air is controlled, so that the time in which atmospheric pressure is restored may be varied.

It has been found desirable to provide means for limiting the pressure which can be applied to the glass, and it is also desirable that this limit shall be capable of variation, so as to permit adjustment to produce variation in the gather. The pressure in the compressed air conduit is controlled and regulated by a pressure reducing valve 95 placed in the pipe 58, which reduces the pressure from that of the source of supply to a pressure determined by the setting of the valve as is usual. The amount of vacuum is limited by a valve 96, shown in section in Fig. 4, located in the pipe 56 leading to the exhaust system. This valve comprises a plunger 97 movable inwardly away from its seat against the compression of a spring 98, seated against the end of a screw 100, by which the pressure of the spring is adjusted. When the vacuum reaches a point where atmospheric pressure overcomes the strength of the spring 98, the valve opens and the vacuum is reduced to a point determined by the setting of the screw 100.

There have now been described three valves which have been named, for convenience, the vacuum, atmosphere and compressed air valves. These may be set to act in any desired sequence, the preferred arrangement being (1) atmosphere to start the discharge of the gather, (2) compressed air to cause a more rapid discharge, and (3) vacuum to stop the extrusion and, if desired cause an intrusion of the stub after severing. In order that normal pressure may be restored after the occurrence of vacuum as well as compressed air, if so desired, a second means is provided for restoring the chamber in the bell 31 to atmospheric pressure. This means may comprise a vent to the atmosphere from any convenient point in the conduit between the valves and the bell. As shown in Figs. 2 and 3, a pipe is connected at the junction of the pipes 46 and 47 and provided with a check valve 102 and a throttle valve 103. The check valve is arranged to close when the conduits are connected with vacuum, but when pressure exists in the system, the check valve opens and permits the constant escape of a relatively small quantity of air. When the valve 50 has been closed to cut off the supply of compressed air, this leakage reduces the chamber of the bell 31 and the conduits connected therewith to normal atmospheric pressure in a time dependent on the adjustment of the throttle valve 103. It will be obvious that this throttle valve or any of the other valves 87, 88, 93 and 94 may be closed to render the connection with any source of pressure inoperative if desired.

The sequence and time of the various steps in the operation of the machine to form a gather or mold charge may be varied widely, and it is to be understood that the operation of the machine as described is by way of example only. The vertical position of the bell 31 is first adjusted by manipulation of the handle 37, and it is locked in this position by the hand screw 40 so as to permit the passage of the required volume of glass for the desired discharge. The machine is then thrown into operation by applying power to the pulley 24. Four steps in the cycle of the machine are indicated, somewhat diagramatically, in Figs. 8, 9, 10 and 11 in which Fig. 8 shows the complete intrusion produced by the vacuum in the chamber of the bell 31. The shape of the lower end of the mold charge is determined in part by the shape of the intruded stub and this may be varied by proper adjustment of the machine. The speed with which the vacuum has been built up may be varied by use of the throttle valve 87, and the time of stopping the application of vacuum may be adjusted by turning the hand wheel 77 to advance or retard the valve closing cam. The next step in the cycle may be, and preferably is, to permit the glass to extrude under the influence of gravity alone. This takes place automatically by the action of the valve opening cam 66 connected with the valve 49 which causes atmospheric pressure to be restored in the bell at a rate determined by the adjustment of the throttle valve 93 which controls the inward movement of air in the branch pipe 89. The time of starting the return to normal pressure may be adjusted by the hand wheel 78 which adjusts the angular position of the cam 66 connected with the atmospheric line, independent of any other adjustment. The approximate form of the gather at this stage is indicated in Fig. 9. If the extrusion by gravity were continued sufficiently, the weight of the gather would cause it to assume a pear shape with an attenuated neck. In order to overcome this attenuation and to form a more nearly cylindrical gather, an extruding impulse is next applied by opening the valve 50 communicating with a supply of compressed air. This is done by the proper valve-opening cam 66 and as with the other air pressures, the time and rapidity with which the compressed air is applied may be independently adjusted by manipulation of the hand wheel 80 and the throttle valve 88. After the desired gather has been formed as indicated in Fig. 10, the application of air pressure is cut off by the valve-closing cam 67 at a time determined by its adjustment.

If the throttle valve 103 is open, the pressure remaining in the chamber of the bell will now be returned to normal in a time depending upon the aperture of the valve, and as soon as the pressure has been reduced to a point sufficiently low to cause the forced extrusion to cease, the gather will commence to acquire a reduced neck, the attenuation of which is limited by the time of the severing operation. If no neck is desired the severing operation will occur shortly after the closing of the compressed air valve, as indicated in Fig. 10.

The shear blades 14 are actuated in timed relation with the formation of the gather by the cams 21 and in order to determine the shape of the severed ends, as well as to prevent excessive heating of the shears, a withdrawing or intruding impulse is applied to the glass during the shearing operation. This is effected by the opening of the vacuum valve 48 in accordance with the adjusted position of its opening cam 66. The speed at which the intruding impulse is applied is determined by the adjustment of the throttle valve 93 by which various modifications in the shape of the severed end may be obtained. With the completion of the intruding movement of the glass, the condition indicated in Fig. 8 will exist and the cycle of the machine is about to be repeated.

It will be observed that the time of starting, the time of stopping, the application of a new pressure and the rate at which any change in pressure is made, are all independently adjustable during the operating of the machine. By this construction it is possible to adjust the feeding machine so as to produce various shaped mold charges adapted to use in as many different shapes of molds. Moreover, by manipulation of the various adjusting devices during the operation of the machine, the shape and size of the charges may be kept uniform notwithstanding the slight changes in heat or other operating conditions, which usually produce slight variation in the charge.

An important advantage resulting from the periodic application of an intermediate stabilizing pressure between the vacuum and compression, is that each application of compression or vacuum is started from a uniform basis, without first having to neutralize the previous pressure before becoming effective in its own capacity. This intermediate pressure is preferably the normal pressure of the atmosphere, although satisfactory results may be obtained by the use of an intermediate pressure somewhat above or below normal atmospheric pressure. This intermediate stabilizing pressure overcomes the tendency to build up compression or vacuum during successive applications, which tendency results in a gradual raising or lowering of the level of the glass over the outlet and a corresponding variation in the weight of the mold charges separated therefrom. This insures that each pressure shall be exactly that intended, without being affected by variations in the previous pressure, which may be cumulative, and gradually cause considerable variation in the weight of the mold charge.

Certain of the sub-joined claims are directed in specific terms to the valve adjustments described above. Other and broader claims directed to the adjustment of the phase relation between the elements of a glass feeder are set forth in Letters Patent, No. 1,573,742, granted to me Feb. 16, 1926.

One specific embodiment of the invention has been described in which the several features are employed in conjunction, but it is to be understood that the details of construction and arrangement of parts set forth is for the purpose of illustration only, and that such construction and arrangement and the conjoint use of the various features is not essential to the broad spirit of the invention except as defined by the appended claims.

What is claimed as new is:—

1. The combination with a molten glass container having a submerged outlet, of three conduits leading respectively to air pressures at, above, and below normal atmospheric pressure, and means for periodically bringing each of said conduits into connection with the container for a definite period of time.

2. The combination of a molten glass container having a submerged outlet, and means to periodically apply pneumatic pressure above atmospheric pressure on the glass in the container, to reduce said pressure below atmospheric pressure and to return the pressure to normal atmospheric pressure, during substantial periods of time in each cycle of operations of said means, whereby the glass issues from the container under normal atmospheric pressure for a definite period and under superatmospheric pressure for a definite period, and whereby the issue of glass is retarded during the definite period of reduced pressure.

3. The combination of a molten glass container having a submerged outlet, means to periodically apply pneumatic pressure on the surface of the glass to exert an extruding force thereon, means to periodically reduce the pressure on the surface of the glass to a point below atmospheric pressure to exert an intruding force on the glass at the outlet, means for periodically exposing the surface of the glass to atmospheric pressure for a definite period of time whereby glass is extruded by the action of gravity alone, and means operating in timed relation with said pressure applying means to periodically sever the glass adjacent to the outlet.

4. The combination with apparatus for separating molten glass into mold charges of a glass container having a submerged outlet, automatic means for periodically applying, in succession and for maintaining for substantial periods of time more than two different air pressures to the surface of the glass to control its discharge through the outlet, and adjustable means for determining the rapidity with which the air pressure is changed while maintaining constant periodicity of pressure applications.

5. The combination with apparatus for separating molten glass into mold charges, of a glass container having a submerged outlet, means for applying pneumatic pressure above and below normal to the surface of the glass, means for returning the pressure on the glass to and maintaining it at normal atmospheric pressure for a definite measurable period of time, and means for adjusting the speed of change from said abnormal pressures to normal atmospheric pressure while maintaining constant frequency of operation.

6. The combination with apparatus for separating molten glass into mold charges of a glass container having a submerged outlet, periodically operated means for applying different successive pressures to the surface of the glass, and means for independently adjusting the time of occurrence of each pressure.

7. The combination with apparatus for separating molten glass into mold charges of a glass container having a submerged outlet, periodically operated means for applying different successive pressures to the surface of the glass, and means for independently adjusting the duration of each pressure.

8. The combination with apparatus for separating molten glass into mold charges of a glass container having a submerged outlet, periodically operated means for applying different successive pressures to the surface of the glass, and means for independently adjusting the time of occurrence and duration of each pressure.

9. The combination with apparatus for separating molten glass into mold charges of a glass container having a submerged outlet, periodically operated means for applying normal atmospheric pressure and pressures above and below normal to the surface of the glass, and means for independently adjusting the time of occurrence and duration of each pressure.

10. The combination with apparatus for separating molten glass into mold charges, of a glass container having a submerged outlet, means for applying an pneumatic impulse to the glass above the outlet, and means for independently changing in a cycle of operations of said impulse applying means the time of beginning and end of the impulse.

11. The combination with apparatus for separating molten glass into mold charges, of a glass container having a submerged outlet, automatic means for applying an pneumatic impulse to the glass above the outlet, and means for independently changing in a cycle of operations of said impulse applying means the time of beginning and end of the impulse during the operation of the machine.

12. The combination with apparatus for separating molten glass into mold charges, of a glass container having a submerged outlet, means for periodically applying a plurality of impulses to the glass above the outlet during each cycle of operations of the said means, and means for independently changing in a cycle of operations of said impulse applying means the time of beginning and end of each impulse.

13. A machine for feeding molten glass having in combination a glass container having a submerged outlet, means for periodically apply air pressure to the surface of the glass to cause it to discharge and retract through the outlet in a predetermined cycle, including a valve to control the application of pressure, means for opening and closing the valve, and means for adjusting the relative time of such opening and closing movements.

14. Apparatus for segregating molten glass into freely suspended gathers of desired shape, including in combination a glass container having a discharge outlet, periodically operated means for applying different pneumatic pressures to the glass in the container for controlling the discharge of glass from the outlet, and for retracting part of the discharged glass into the outlet in regular cycles, means for adjusting said controlling means to vary the speed and the duration of the discharge and retraction, while maintaining the frequency of operation of the controlling means constant.

15. The combination of a molten glass container having a submerged outlet, means for confining the air above the surface of the glass in proximity to the outlet, conduits communicating with the confined air for respectively reducing and increasing the pressure thereof, a conduit for opening the confined air to the atmosphere, a valve in each conduit, a cam for opening each valve, a cam for closing each valve, and means for adjusting the relative time of action of each cam.

16. The combination with a molten glass container having a submerged outlet, of a plurality of conduits leading respectively to air pressure below normal, atmospheric pressure, and air pressure above normal, a valve controlling each conduit, means for opening and closing the valves in timed relation, and means to permit independent adjustment of the opening and closing time of each valve during the operation of the machine.

17. The combination with a container for molten glass having a submerged outlet, of means for applying air pressure above normal pressure to the surface of the glass above the outlet, means for applying pressure below normal to said surface, means to restore the pressure on said surface to normal after the application of an abnormal pressure, means for adjusting the rate of return to a normal pressure from a pressure above normal, and means for independently adjusting the rate of return to a normal pressure from a pressure below normal.

18. The combination with a molten glass container having a submerged outlet, of a source of abnormal air pressure, means for periodically applying the pressure to the glass to produce a movement of the glass in the outlet, independent means operating in timed relation to said first-named means for causing a cessation of said pressure, and means for varying the relative time of actuation of said first and second named means.

19. The combination with a molten glass container having a submerged outlet, of automatic means for periodically applying a pressure above atmospheric pressure to the surface of the glass over the outlet, and other means operating in timed relation to said first named means for periodically exposing said surface to atmospheric pressure for definite periods of time.

20. The combination with a molten glass container having a submerged outlet, of automatic means for periodically applying a pressure below atmospheric pressure to the surface of the glass over the outlet, and other means operating in timed relation to said first named means for periodically exposing said surface to atmospheric pressure for definite periods of time.

21. The combination with a molten glass container having an outlet, of automatic means for periodically applying three different pneumatic pressures each of definite and substantial duration to a surface of the glass near the outlet during each cycle of operations of said automatic means to regulate the movement of glass in the outlet.

22. The combination with a molten glass container having a submerged outlet, of means for periodically severing mold charges from glass discharged through the outlet, means for applying a pressure above atmospheric for a definite time to the surface of the glass over the outlet, means for applying a pressure below atmospheric to said surface, for a definite time, and means for applying a uniform intermediate pressure during a substantial part of the time elapsing between successive severing operations, all of said means operating periodically in timed relation.

23. The combination with a molten glass container having an outlet, of means for periodically applying pneumatic pressure other than atmospheric to the surface of the glass over the outlet, and means for restoring said surface for a definite period of time to a uniform stabilizing pressure before each application of said first named pressure, said restoring means being adjustable independently of the first named pressure applying means to vary the time of occurrence of said restoration.

24. The method of separating a mass of molten glass in a container having a submerged outlet, into mold charges, which includes the steps of regulating the movement of glass in the outlet by the application of pneumatic pressure above and below atmospheric to the surface of the glass over the outlet for definite periods of time, and periodically exposing said surface to atmospheric pressure for definite intermediate periods of time of measurable duration.

25. The method of separating a mass of molten glass in a container having an outlet, into mold charges, which includes the steps of periodically and successively applying three different pneumatic pressures, each for an appreciable substantial period of time, to the surface of the glass to regulate its movement in the outlet.

26. The method of separating a mass of molten glass in a container having a submerged outlet, into mold charges, which includes the steps of exposing the surface of the glass over the outlet to a pressure above atmospheric, a pressure below atmospheric, and an intermediate pressure, all three pressures being of substantial duration.

27. The method of separating a mass of molten glass in a container having an outlet, into mold charges, which includes the steps of periodically applying two different pneumatic discharge-regulating pressures other than atmospheric to the surface of the glass over the outlet each for a definite period of time, and applying a uniform stabilizing pressure for a definite period of time of substantial duration between the applications of regulating pressure.

28. The combination of a receptacle to contain molten glass, said receptacle having an outlet opening in the bottom thereof, a cylinder open at its lower end projecting downward beneath the surface of the glass over said opening, means automatically to vary the pressure within said cylinder, and means to adjust said cylinder up and down to cause a more or less restricted passageway between the bottom of the cylinder and the floor of the receptacle, said cylinder being adjustable into contact with the floor to cut off communication between said opening and the glass surrounding the cylinder.

29. The combination of a receptacle to contain molten glass, said receptacle having an outlet opening, a valve extending into the molten glass, means to cause a periodic discharge of glass through said opening while the valve is in open position and independently of any movement of the valve, and means to close said valve and thereby cut off the supply of glass to said opening.

30. The combination of a receptacle to contain molten glass, said receptacle having an outlet opening, a normally stationary valve extending into the molten glass, means to move said valve to a closed position and cut off the supply of glass to said opening, and means to blow the glass out of said opening while the valve is closed.

31. The combination of a receptacle to contain molten glass, said receptacle having an opening, a tubular valve extending downward into the glass above said opening and having a normal stationary open position above said opening, means to cause a periodic discharge of glass from said opening while the valve is in said position, and means to move said valve downward and cut off the supply of glass to said opening.

32. The combination of a container for molten glass, said container having a passageway through a wall thereof for the discharge of glass, a valve within the container to cut off said passageway from the body of glass, means to blow the glass out of said passageway, means to hold the valve in open position, and means cooperating with said blowing means to cause a periodic discharge of glass while the valve is in said open position.

33. The combination of a receptacle to contain molten glass, said receptacle having an opening in the bottom thereof, a cylinder open at its lower end projecting downward beneath the surface of the glass over said opening, automatic means to vary the pressure within the cylinder, said cylinder having a normally fixed position permitting the passage of the surrounding glass to said opening, and means whereby the cylinder may be adjusted into position to cut off communication between said opening and the glass surrounding the cylinder.

34. The combination of a receptacle to contain molten glass, said receptacle having an opening in the bottom thereof, a cylinder open at its lower end projecting downward beneath the surface of the glass over said opening, automatic means to vary the pressure within the cylinder, said cylinder having a normally fixed position permitting the passage of the surrounding glass to said opening, means whereby the cylinder may be adjusted into position to cut off communication between said outlet opening and the glass surrounding the cylinder, and means cooperating with said pressure varying means for blowing the glass out of said cylinder and outlet while the cylinder is in said last mentioned position.

35. The combination of a receptacle to contain a mass of molten glass, the receptacle having an outlet opening, a normally stationary mechanical element within the glass, means cooperating therewith to cause a periodically varying flow of glass from said outlet without closing the outlet to the mass in the receptacle, and means for moving said element into position to close said outlet.

36. The method of separating molten glass into mold charges, that comprises permitting glass to flow through a discharge outlet under substantially normal atmospheric pressure for a measurable period of time to form part of a mold charge, then applying superatmospheric pneumatic pressure to the surface of the glass to accelerate the discharge of glass through said outlet and thereby to complete and shape the charge, and thereafter subjecting the surface of the glass to subatmospheric pressure, also for a definite period of time, to retard the discharge of glass from said outlet.

37. The combination with a container for molten glass having a submerged outlet, of means providing a passage submerged at one end in the glass over the outlet, means communicating with said passage for periodically causing super-atmospheric and sub-atmospheric pressures on the glass in the passage, a conduit connected with said passage and having a pair of branches each open to the atmosphere, an inwardly opening check valve in one of said branches, and an outwardly opening check valve in the other of said branches.

38. In a glass feeder, a container for molten glass having a submerged outlet, an air bell dipping into the glass in the container above the outlet and having a passage extending above the glass, three separate conduits communicating with said passage, one adapted for connection with a source of intermittently effective super-atmospheric pressure supply, one adapted for connection with a source of intermittently effective sub-atmospheric pressure supply and the other adapted to periodically establish communication between said passage and the atmosphere, pressure reducing means associated with said super-atmospheric pressure conduit, and sub-atmospheric pressure limiting means associated with said sub-atmospheric pressure conduit.

39. In a glass feeder, a container for molten glass having a submerged outlet, an air bell dipping into the glass in the container above the outlet and having a passage extending from below the surface of the glass above the latter, three conduits respectively adapted to connect said passage periodically with a source of super-atmospheric pressure, a source of sub-atmospheric pressure and the atmosphere, and an additional conduit connected with said passage and having an outwardly opening check valve to permit the constant escape of a relatively small quantity of air from said passage.

Signed at Toledo, Ohio, this 14th day of July, 1920.

KARL E. PEILER.

CERTIFICATE OF CORRECTION.

Patent No. 1,662,436.                               Granted March 13, 1928, to

KARL E. PEILER.

It is hereby certified that error appears in the printed specification of the above numbered patent requiring correction as follows: Page 6, line 110, claim 13, for the word "apply" read "applying"; and that the said Letters Patent should be read with this correction therein that the same may conform to the record of the case in the Patent Office.

Signed and sealed this 10th day of April, A. D. 1928.

(Seal)

M. J. Moore,
Acting Commissioner of Patents.

DISCLAIMER 1,662,436.—*Karl E. Peiler*, West Hartford, Conn. APPARATUS FOR AND METHOD OF FEEDING MOLTEN GLASS. Patent dated March 13, 1928. Disclaimer filed December 13, 1934, by the assignee, *Hartford-Empire Company.*

Hereby disclaims said claims 25, 26, 27, 31, and 33 for the purpose of complying with what is understood to be required by law and to safeguard said owner's rights under the claims of said patent not hereby disclaimed; all without in any way modifying the scope, or affecting the validity, of said remaining claims.

"25. The method of separating a mass of molten glass in a container having an outlet, into mold charges, which includes the steps of periodically and successively applying three different pneumatic pressures, each for an appreciable substantial period of time, to the surface of the glass to regulate its movement in the outlet.

"26. The method of separating a mass of molten glass in a container having a submerged outlet, into mold charges, which includes the steps of exposing the surface of the glass over the outlet to a pressure above atmospheric, a pressure below atmospheric, and an intermediate pressure, all three pressures being of substantial duration.

"27. The method of separating a mass of molten glass in a container having an outlet, into mold charges, which includes the steps of periodically applying two different pneumatic discharge-regulating pressures other than atmospheric to the surface of the glass over the outlet each for a definite period of time, and applying a uniform stabilizing pressure for a definite period of time of substantial duration between the applications of regulating pressure."

"31. The combination of a receptacle to contain molten glass, said receptacle having an opening, a tubular valve extending downward into the glass above said opening and having a normal stationary open position above said opening, means to cause a periodic discharge of glass from said opening while the valve is in said position, and means to move said valve downward and cut off the supply of glass to said opening."

"33. The c mbination of a receptacle to contain molten glass, said receptacle having an opening in the bottom thereof, a cylinder open at its lower end projecting downward beneath the surface of the glass over said opening, automatic means to vary the pressure within the cylinder, said cylinder having a normally fixed position permitting the passage of the surrounding glass to said opening, and means whereby the cylinder may be adjusted into position to cut off communication between said opening and the glass surrounding the cylinder."

[*Official Gazette January 8, 1935.*]

DISCLAIMER 1,662,436.—*Karl E. Peiler*, West Hartford, Conn. APPARATUS FOR AND METHOD OF FEEDING MOLTEN GLASS. Patent dated March 13, 1928. Disclaimer filed January 26, 1935, by the assignee, *Hartford-Empire Company*.

Hereby disclaims said claims 24 and 36 for the purpose of complying with what is understood to be required by law and to safeguard said owner's rights under the claims of said patent not hereby disclaimed; all without in any way modifying the scope, or affecting the validity, of the claims remaining in said patent.

"24. The method of separating a mass of molten glass in a container having a submerged outlet, into mold charges, which includes the steps of regulating the movement of glass in the outlet by the application of pneumatic pressures above and below atmospheric to the surface of the glass over the outlet for definite periods of time, and periodically exposing said surface to atmospheric pressure for definite intermediate periods of time of measurable duration."

"36. The method of separating molten glass into mold charges, that comprises permitting glass to flow through a discharge outlet under substantially normal atmospheric pressure for a measurable period of time to form part of a mold charge, then applying superatmospheric pneumatic pressure to the surface of the glass to accelerate the discharge of glass through said outlet and thereby to complete and shape the charge, and thereafter subjecting the surface of the glass to subatmospheric pressure, also for a definite period of time, to retard the discharge of glass from said outlet."

[*Official Gazette February 26, 1935.*]